A. B. Sprout.
Horse Rake Tooth.
Nº 54430      Patented May 1, 1866
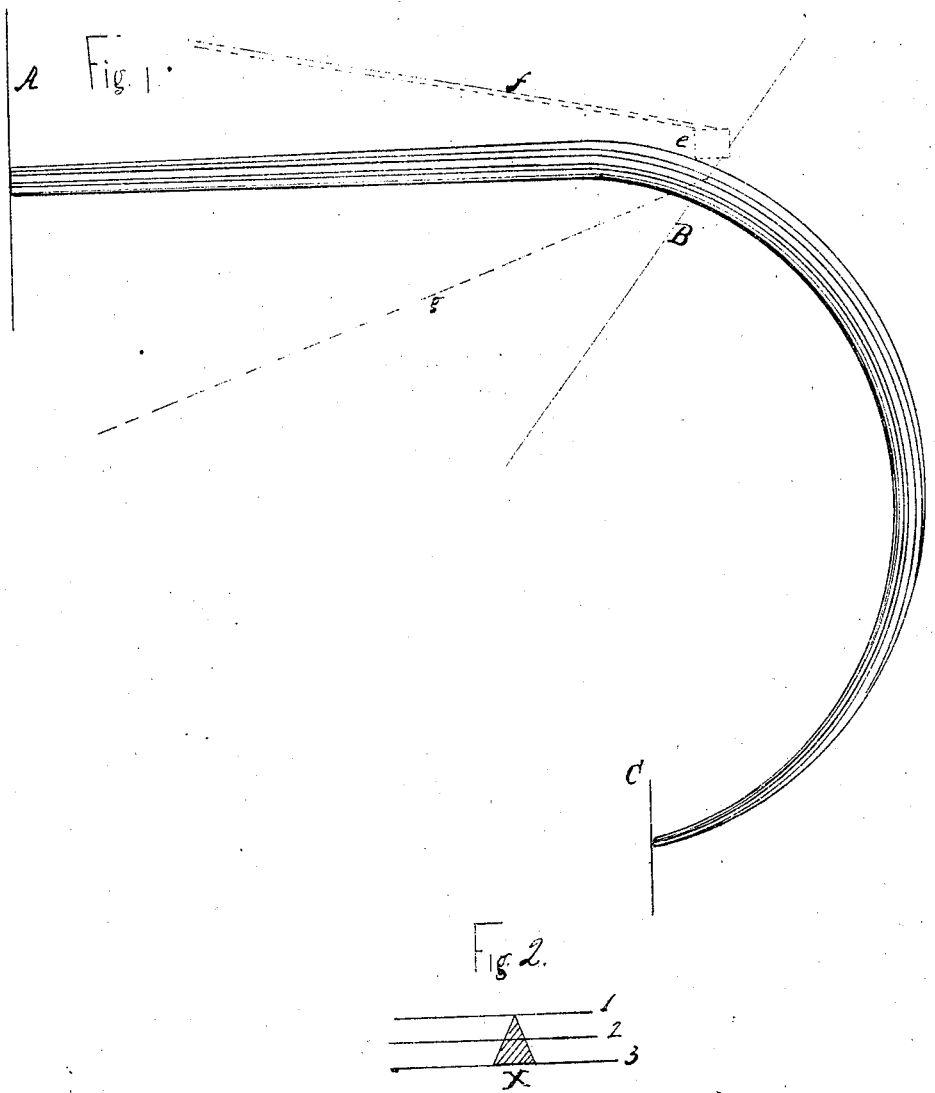
Witnesses.
James J. Johnston
John Johnston
Inventor.
A. B. Sprout

UNITED STATES PATENT OFFICE.

A. B. SPROUT, OF HUGHESVILLE, PENNSYLVANIA.

IMPROVEMENT IN HORSE-RAKE TEETH.

Specification forming part of Letters Patent No. 54,430, dated May 1, 1866.

*To all whom it may concern:*

Be it known that I, A. B. SPROUT, of Hughesville, in the county of Lycoming and State of Pennsylvania, have invented a new and useful Improvement in Teeth for Horse-Rakes; and I do hereby declare that the following is a full and exact description thereof, reference being had to the accompanying drawings, and to the letters of reference marked thereon.

It is a fact well understood by manufacturers of horse-rakes, and also by the farmers who use them, that in horse-rakes having steel teeth which are curved and are springs within themselves it is necessary, in order to make such rakes work well, to have weight and support at or near the center of the curve of the teeth. Now, to accomplish the end of giving weight and support at or near the center of the curve of said teeth, various and numerous devices have been and are now used, such as a weighted bar (seen in the patent granted to me November 25, 1862) held down by springs, staples, staples and springs combined, braces, &c., all of which go to make the horse-rake having steel teeth which are curved and are springs within themselves both complicated and costly.

Now, the object of my invention is to avoid the use of weighted bars, springs, springs and staples combined, braces, and like devices, in connection with steel teeth for horse-rakes, as set forth.

The nature of my invention consists in constructing, of steel or iron, curved teeth for horse-rakes, so that said teeth shall be springs within themselves, and have at or near the center of their curve the greatest power of resistance against the strain, traction, and tensile force brought on or against the teeth by the hay or other matter in raking.

To enable others skilled in the art of making teeth for horse-rakes to make and use my invention, I will proceed to describe its construction and operation.

In the accompanying drawings, Figure 1 represents a side view of my improved teeth for horse-rakes. Fig. 2 represents a transverse section of the same.

In constructing curved teeth which are springs within themselves I use rods or bars of cast steel or iron of suitable size and of the desired form, I prefer the angular. These rods or bars I cut into the required lengths for the teeth, and then, by forging, swaging, drawing, or by means of suitable rolls, gradually diminish in size from or near the center toward each end of the rods, taking care in every case to have the decrease or taper in the rods to commence at a point which will cause the greatest power to resist force and strain to be at or near the center of the curve of the teeth. After making the rods into the desired form and length I then heat them, bend them, and give them the desired curve, after which they are properly tempered. They are then ready for use.

In the accompanying drawings it will be observed that from line B (which is near the center of the curve of the tooth) to the line C the decrease or taper is greater than from line B to line A. This difference is made for the purpose of allowing that part of the tooth which is between the lines B and C to yield and deflect more than the part between the lines B and A, and also for the purpose of making the teeth so that they will more readily leave the hay when raking and be more easily balanced.

When I use the angular form of steel in constructing my improved teeth I place the flat side (marked X) on the inside of the curve, so that by dividing the tooth longitudinally by a line placed midway between the face X and the outer edge, as indicated by the lines 1, 2, and 3, the most metal will always be between lines 2 and 3, as represented in Fig. 2.

The dotted lines $e$, which are placed near the line B, which is near the center of the curve of the tooth, (see Fig. 1,) represent the bar usually used for imparting weight and support at that point or part of the tooth.

The dotted lines $f$ represent the springs which are used in connection with the bar $e$. The dotted line $g$ represents springs or braces which are often used for holding down the teeth and giving them support at or near the point marked B.

The dotted lines $e$, $f$, and $g$ are used to represent more clearly the nature and advantages of my improvement, but do not represent any part of my device, for the object of my improvement is to avoid the use of these bars, springs, and braces.

The advantages of my improvement in steel or iron teeth for horse-rakes are as follows:

First, by the peculiar construction of my improved teeth I impart strength to the teeth at the point where strength and power is most required, to wit, at or near the center of the curve of the teeth; second, by the peculiar construction of my improved teeth that part of the teeth which comes in contact with the hay in raking will yield and deflect with more ease and without being so liable to break at the point indicated by line B in Fig. 1 as those constructed in the usual way; third, by the peculiar construction of my improved teeth I obtain a double yielding and deflection of the teeth, to wit, from line B to line C, and from line B to line A, said double yielding and deflection being accomplished without the aid of weighted bars, staples, braces, or springs, other than the spring which is in the teeth themselves; fourth, by the peculiar construction of my improved teeth they will more readily leave the hay in raking and can be more easily balanced than those constructed in the ordinary manner; fifth, by the peculiar construction of my improved teeth I economize steel in making teeth for horse-rakes by placing more metal in that part of the teeth which needs it most, to wit, at or near the center of their curve, and less metal in other parts of the teeth; sixth, by the peculiar construction of my improved teeth I simplify the construction of horse-rakes by being able to avoid the use of weighted bars, springs, staples, and braces in connection with the teeth; seventh, by the peculiar construction of my improved teeth in constructing horse-rakes I greatly save in cost, time, labor, and trouble by being able to dispense with weighted bars, springs, staples, and braces, as connected with the teeth, and at the same time accomplish all that is required of teeth for horse-rakes.

Having thus described the nature, construction, operation, and advantages of my improvement in teeth for horse-rakes, I wish it to be clearly understood that I do not claim a taper tooth, when made of wood and used in connection with horse-rakes, or when connected with hand rakes, harrows, and like devices; but

What I claim as my invention is—

Constructing, of steel or iron, a curved tooth for horse rakes, said tooth being a spring within itself and tapering from the line B to the line C, and from the line B to the line A, substantially as herein described, and for the purpose set forth.

A. B. SPROUT.

Witnesses:
 JAMES J. JOHNSTON,
 ALEX. HAYS.